(12) United States Patent
Vandermeijden et al.

(10) Patent No.: US 12,032,786 B2
(45) Date of Patent: Jul. 9, 2024

(54) SYSTEM AND METHOD FOR MITIGATING AND/OR AVOIDING NOISE FOR INPUT DEVICES AND INPUT OBJECTS

(71) Applicant: Synaptics Incorporated, San Jose, CA (US)

(72) Inventors: Tom Vandermeijden, San Jose, CA (US); Ching-Hsung Wang, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 69 days.

(21) Appl. No.: 17/854,136

(22) Filed: Jun. 30, 2022

(65) Prior Publication Data

US 2024/0004498 A1    Jan. 4, 2024

(51) Int. Cl.
*G06F 3/041*    (2006.01)
*G06F 3/044*    (2006.01)

(52) U.S. Cl.
CPC ........ *G06F 3/04182* (2019.05); *G06F 3/0441* (2019.05); *G06F 2203/04105* (2013.01)

(58) Field of Classification Search
CPC .............. G06F 3/04182; G06F 3/0441; G06F 2203/04105
See application file for complete search history.

(56) References Cited

U.S. PATENT DOCUMENTS

| | | | |
|---|---|---|---|
| 2018/0335861 A1* | 11/2018 | Wu | G06F 3/03545 |
| 2019/0324564 A1* | 10/2019 | Brunet | G06F 3/0446 |
| 2020/0064943 A1* | 2/2020 | Chang | G06F 3/044 |
| 2021/0019019 A1* | 1/2021 | Zhang | G06F 3/03545 |
| 2021/0294478 A1* | 9/2021 | Jeon | G06F 3/0414 |

* cited by examiner

*Primary Examiner* — Amit Chatly
(74) *Attorney, Agent, or Firm* — Leydig, Voit & Mayer, Ltd.

(57) ABSTRACT

A method is provided. The method comprises: providing, by a control system of an input device, one or more first beacon signals to an input object; based, at least in part, on force data from the input object, detecting, by the control system, noise interference associated with providing at least one of the one or more first beacon signals to the input object; based, at least in part, on detecting the noise interference, altering, by the control system, a timing schedule for providing one or more subsequent beacon signals; and providing, by the control system, the one or more subsequent beacon signals to the input object based, at least in part, on the timing schedule.

18 Claims, 7 Drawing Sheets

SYSTEM AND METHOD FOR MITIGATING AND/OR AVOIDING NOISE FOR INPUT DEVICES AND INPUT OBJECTS

BACKGROUND

Input devices such as touch sensor devices (also commonly called touchpads or proximity sensor devices), are widely used in a variety of electronic systems. Touch sensor devices typically include a sensing region, often demarked by a surface, in which the touch sensor device determines the presence, location and/or motion of one or more input objects, typically for purposes allowing a user to provide user input to interact with the electronic system. Another type of input device may be a touchscreen that includes a plurality of electrodes and is also capable of allowing the user to provide user input to interact with the electronic system.

In some instances, the input device is configured to detect and track an input object such as a capacitive pen, an active stylus, and/or a universal stylus initiative (USI) pen/stylus. To detect and track capacitive pens, the input device transmits a beacon signal, which is used to perform synchronization between the input object and the input-display device. However, in certain circumstances, noise may be present when the input device transmits the beacon signal, which causes de-synchronization between the input device and the input object.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a method. The method comprises: providing, by a control system of an input device, one or more first beacon signals to an input object; based, at least in part, on force data from the input object, detecting, by the control system, noise interference associated with providing at least one of the one or more first beacon signals to the input object; based, at least in part, on detecting the noise interference, altering, by the control system, a timing schedule for providing one or more subsequent beacon signals; and providing, by the control system, the one or more subsequent beacon signals to the input object based, at least in part, on the timing schedule.

In another exemplary embodiment, the present disclosure provides an input device comprising a control system. The control system comprises: one or more processors; and a non-transitory computer-readable medium having processor-executable instructions stored thereon, the processor-executable instructions, when executed by the one or more processors, facilitating performance of the following: providing one or more first beacon signals to an input object; based, at least in part, on force data from the input object, detecting noise interference associated with providing at least one of the one or more first beacon signals to the input object; based, at least in part, on detecting the noise interference, altering a timing schedule for providing one or more subsequent beacon signals; and providing the one or more subsequent beacon signals to the input object based, at least in part, on the timing schedule.

In yet another exemplary embodiment, the present disclosure provides a non-transitory computer-readable medium having processor-executable instructions stored thereon, the processor-executable instructions, when executed, facilitating performance of the following: providing one or more first beacon signals to an input object; based, at least in part, on force data from the input object, detecting noise interference associated with providing at least one of the one or more first beacon signals to the input object; based, at least in part, on detecting the noise interference, altering a timing schedule for providing one or more subsequent beacon signals; and providing the one or more subsequent beacon signals to the input object based, at least in part, on the timing schedule.

Further features and aspects are described in additional detail below with reference to the FIGS.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Figure 4A:
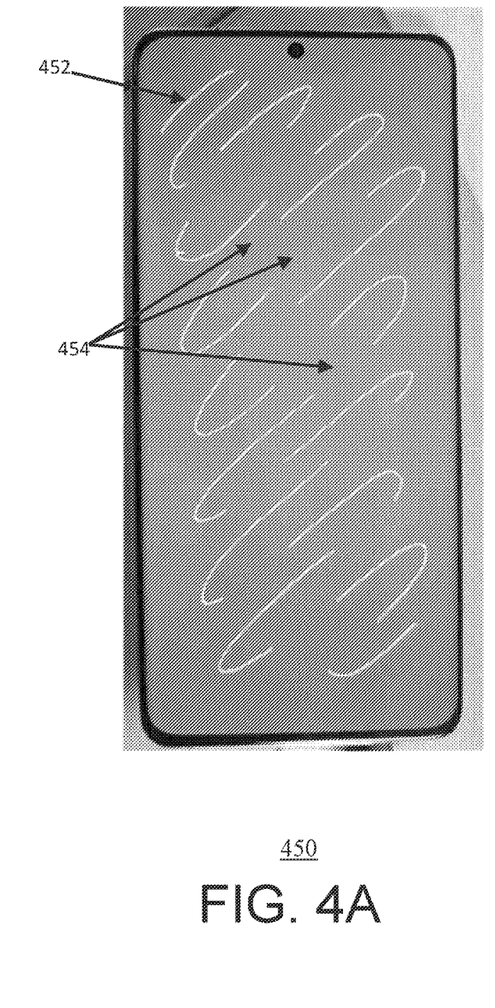
FIGS. 4A and 4B depict exemplary representations of an input object providing user input to an input device and encountering noise according to one or more examples of the present application.
Figure 4B:
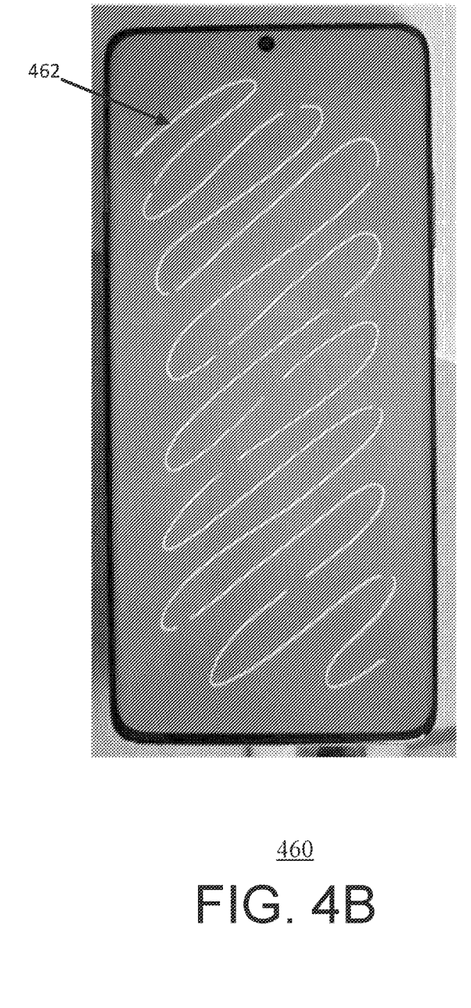

Exemplary devices and methods discussed herein provide for mitigating and/or avoiding noise for input devices and input objects. For instance, an input object may be and/or include, but are not limited to, a capacitive pen, an active stylus, and/or a USI pen/stylus. The input device may be and/or include, but are not limited to, a laptop, mobile device, gaming device, and/or other types of devices that are capable of sensing inputs from an input object. For the input object to communicate with the input device, the input device may periodically provide a beacon signal (e.g., a direct sequence spread spectrum (DSSS) beacon signal) to the input object, and the beacon signal(s) may be used to synchronize the input device with the input object. Based on the synchronization, the input object may provide information (e.g., force data and/or a position signal such as a position tone) to the input device, and the input device may use the information to perform tasks (e.g., permitting a user to draw on the display of the input device, which is shown in FIGS. 4A and 4B).

In some instances, noise may be present when the beacon signal is provided to the input object, and the noise may cause de-synchronization between the input device and the input object. Based on the noise, at least some of the user input from the input object might not be detected by the input device. For instance, in some variations, the input device may include and/or be coupled to a converter that converts power from a power source (e.g., a 120 Volt (V) power source) to a power level that is usable by the input device (e.g., 5 V) and/or a charging device that provides power to the input device. The converter and/or charging device may generate noise. In some examples, the noise may be periodic such as being present every 3 milliseconds (ms) and may last a brief time interval (e.g., last between 20 microseconds (μs) to 50 μs). The input device may provide the beacon signal to the input object periodically as well such as at 60 Hertz (hz), which corresponds to providing the beacon signal every 16.66 ms. As such, there may be an overlap where the noise occurs during the time window when the beacon signal is provided to the input object, which causes the de-synchronization between the input object and the input device. For instance, based on the beacon signal becoming corrupted (e.g., impacted by the noise), the input object might not be able to detect the beacon signal, which may cause de-synchronization between the input object and the input device.

In order to mitigate and/or avoid the noise when the beacon signal is being provided, a control system (e.g., a control system of the input device) may be configured to alter the timing for sending the beacon signal to the input object (e.g., schedule the transmission of the beacon signal to avoid the noise). For instance, the control system may determine a delay for the beacon signal (e.g., 1.1 ms delay), and delay sending of the beacon signal to avoid the noise. Additionally, and/or alternatively, the control system may use feedback from the input object (e.g., force data indicating a force applied by the input object and/or position signal (e.g., position tone) indicating a position of the input object) to determine whether the input device lost communication with the input object or whether the input object was merely lifted from the display of the input device. Based on the determination, the control system may set the delay time interval. Additionally, and/or alternatively, the control system may generate a noise profile indicating the periodic nature of the noise and use the noise profile to alter the timing for sending the beacon signal to the input object. As such, the devices and methods described herein provide for various advantages in the communication scheme between the input device and the input object such as by altering the transmission schedule for the beacon signal to avoid and/or mitigate the noise from impacting the transmission of the beacon signal.

Figure 1A:
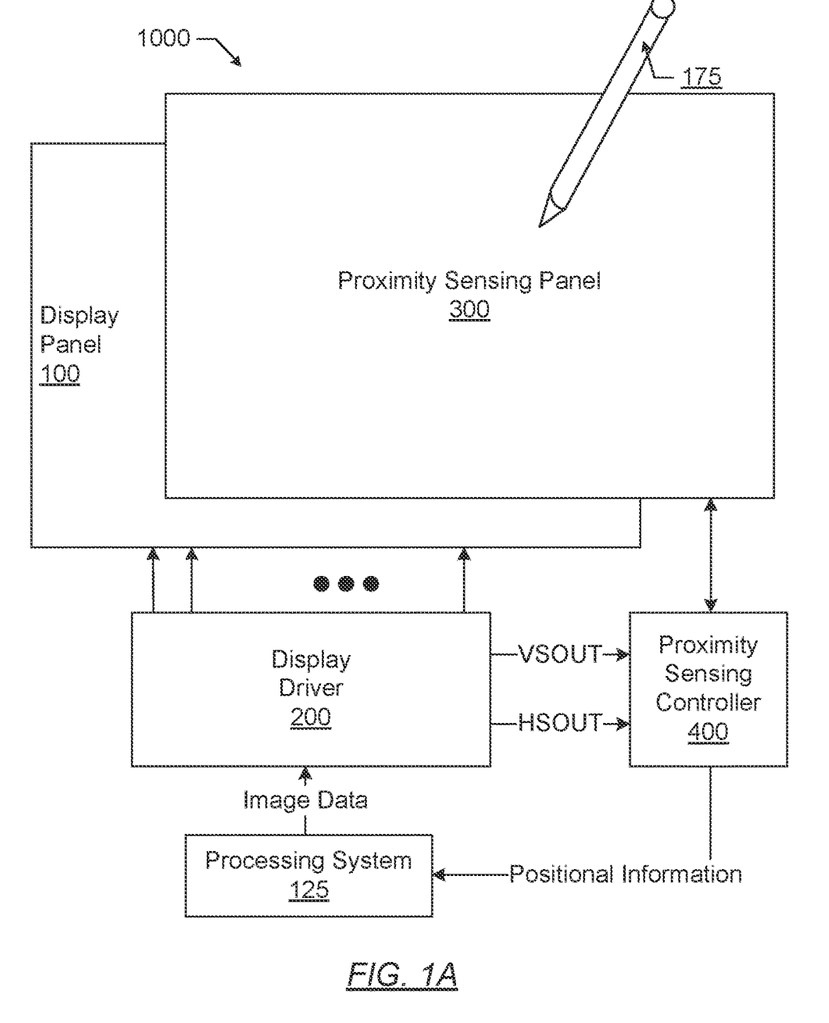
FIG. 1A shows an example configuration of an input device according to one or more examples of the present application.
Figure 1B:
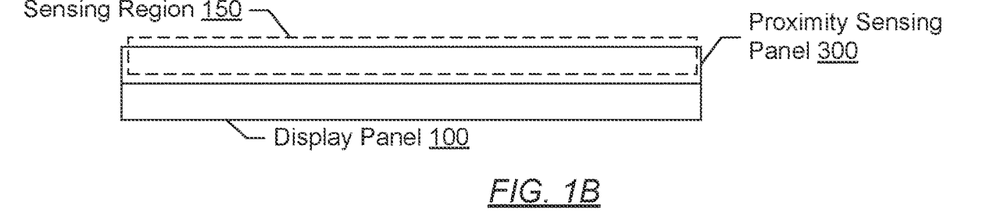
FIG. 1B shows an example side view of the input-display device according to one or more examples of the present application.

FIG. 1A shows an example configuration of an input device 1000 according to one or more examples. FIG. 1B shows an example side view of the input-display device according to one or more examples of the present application. For instance, input devices, such as the input device 1000 shown in FIG. 1A, may be configured to display information (e.g., an image) and/or include sensors for proximity sensing (e.g., detecting user input from an input device). Input devices are often used as user-interfaces of electronic systems. The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), automotive user interfaces configured to give drivers user interface capabilities, and/or other types of electronic systems. The input device 1000 may include a display panel 100 and a proximity sensing panel 300 having sensor electrodes disposed neighboring or integrated in the display panel 100. The input device 1000 may be configured to display an image on the display panel 100 while sensing one or more input objects (e.g., a USI pen/stylus) located on or near the display panel 100 based on resulting signals received from the sensor electrodes.

In addition to the display panel 100 and proximity sensing panel 300, the input device 1000 includes a display driver 200 and a proximity sensing controller 400. The display panel 100 may be coupled to the display driver 200, and the proximity sensing panel 300 may be coupled to the proximity sensing controller 400. The display driver 200 and the proximity sensing controller 400 are further coupled to a processing system 125. Examples of the processing system 125 include an application processor, a central processing unit (CPU), a special purpose processor, and other types of processors and/or controllers. In some instances, the processing system 125 may include the display driver 200 and/or the proximity sensing controller 400. For instance, the processing system 125 may perform the functionalities of the display driver 200 and/or the proximity sensing controller 400. In some variations, the display driver 200, the proximity sensing controller 400, and/or the processing system 125 may be implemented as engines, software functions, and/or applications. In other words, the functionalities of the display driver 200, the proximity sensing controller 400, and/or the processing system 125 may be implemented as software instructions stored in storage (e.g., memory or a computer-readable medium) and executed by one or more processors. A control system, which is used to alter the timing for sending the beacon signal to the input object 175 (e.g., the capacitive pen), may include and/or be the processing system 125, the proximity controller 400, the display driver 200, and/or other entities or components for controlling the timing for sending the beacon signals to the input object 175.

Although shown skewed in FIG. 1A, as shown in FIG. 1B, the proximity sensing panel 300 may be disposed on or near the display panel 100 and at least partially overlapping the display panel 100. The proximity sensing panel 300 defines the sensing region 150 where input objects may be detected.

Returning to FIG. 1A, the input object 175 is a pen (e.g., a capacitive pen, stylus, or active pen). The input object 175 transmits input object signals based on the input object 175 detecting a beacon signal from the input device 1000. These signals are signals that originate from the input object 175 and may alter the capacitance detected by the proximity sensing panel 300. In some instances, the input object 175 is an active pen that complies with the USI protocol. The input object signals may include force data and/or a position signal. The force data may indicate a force being applied by the input object on the input device 1000 (e.g., on the proximity sensing panel 300). For instance, the input object 175 may include one or more sensors (e.g., a strain gauge) that are configured to obtain a force measurement associated with the user pressing the input object 175 down on the input device 1000. The input object 175 may provide the force measurement to the input device 1000. The position signal may indicate a position of the input object 175 relative to the proximity sensing panel 300. For instance, the position signal may be a constant square or sine wave that is several ms in length. The position of the input object 175 may be determined based on the particular sensor electrode of the proximity sensing panel 300 that detects the position signal (e.g., based on the x-axis and y-axis associated with the sensor electrode that detects the position signal, the position of the input object 175 relative to the proximity sensing panel 300 may be determined).

Figure 2:
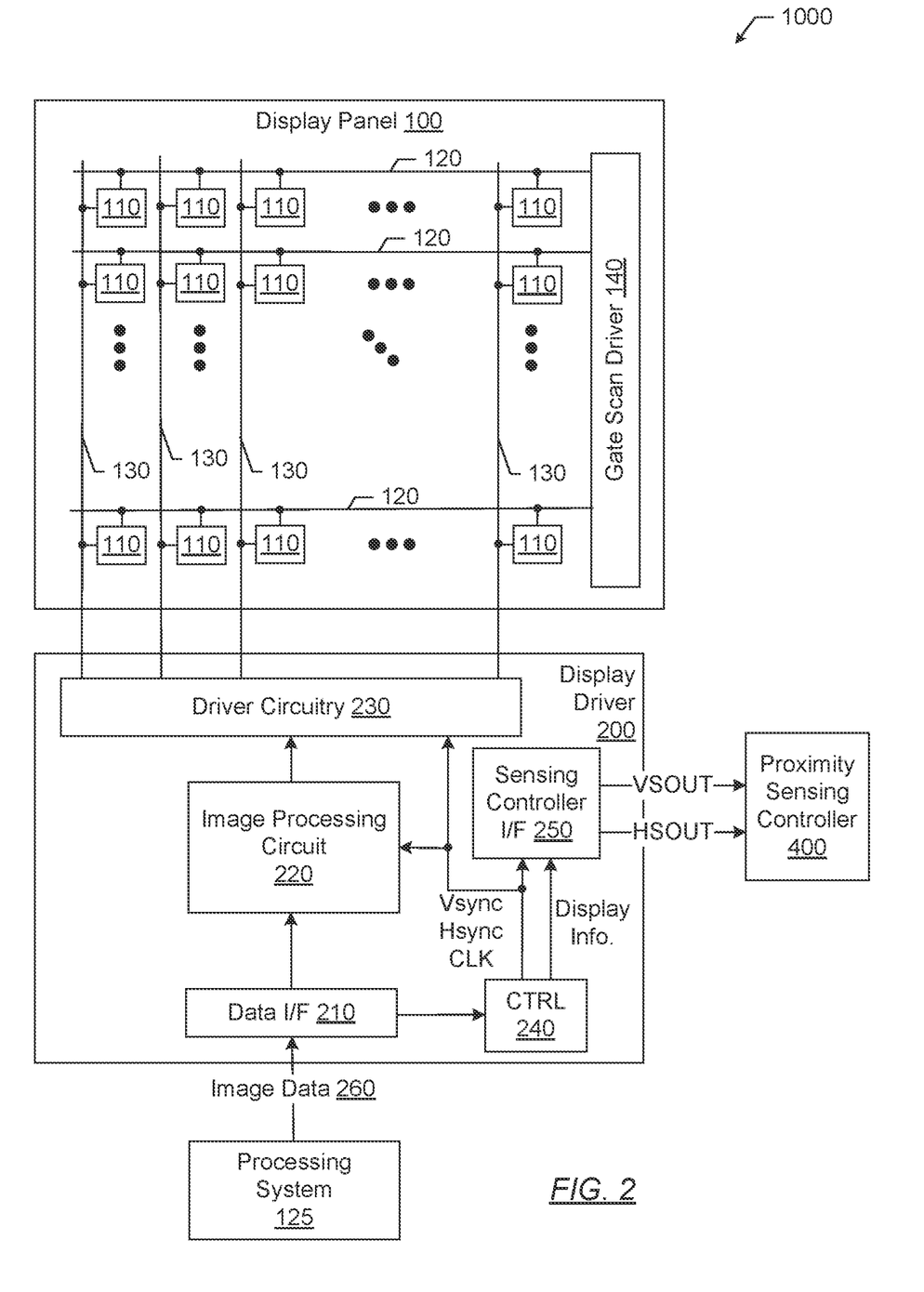
FIG. 2 shows an example configuration of a display panel according to one or more examples of the present application.

FIG. 2 shows an example configuration of a display panel 100 according to one or more examples of the present application. The display panel 100 of the input device 1000 may be any type of dynamic display capable of displaying a visual interface to a user. Examples of the display panel 100 include organic light emitting diode (OLED) display panels, micro light emitting diode (LED) display panels and/or liquid crystal display (LCD) panels. As shown, the display panel 100 includes display elements 110 (e.g., pixel circuits), gate lines 120 (also referred to as scan lines), source lines 130 (also referred to as data lines), and a gate scan driver 140. Each display element 110 may include an OLED pixel, a micro LED pixel, an LCD pixel, and/or a different type of pixel. Each display element 110 is coupled to the corresponding gate line 120 and source line 130. The source lines 130 may be configured to provide data voltages to display elements 110 of the display panel 100 to update (or program) the display elements 110 with the data voltages. The gate lines 120 are used to select rows of display elements 110 to be updated with the data voltages. Thus, when display elements 110 of a selected row is to be updated, the gate scan driver 140 asserts the gate line 120 coupled to the display elements 110 of the selected row. The source lines 130 may each have a significant capacitance since the source lines 130 almost traverse the display panel 100 in the vertical direction.

The display panel 100 may further include other components and/or signal lines depending on the display technology. In examples where an OLED display panel is used as the display panel 100, for example, the display panel 100 may further include emission lines that control light emission of the display elements 110 and power lines that delivers a power supply voltage to the respective display elements 110.

The display driver 200 is configured to drive the source lines 130 of the display panel 100 based on image data 260 received from the processing system 125. The image data corresponds to one or more images to be displayed on the display panel 100. The image data may include gray levels of the respective display elements 110 of the display panel 100. The display driver 200 is configured to generate data voltages for the respective display elements 110 based on the image data received from the processing system 125 and provide the generated data voltages to the respective display elements 110 via the source lines 130. The display driver 200 includes a data interface (I/F) 210, an image processing circuit 220, driver circuitry 230, a controller (CTRL) 240, and a proximity sensing controller interface (I/F) 250.

The data interface 210 is configured to receive image data 260 from the processing system 125 and forward the image data 260 to the image processing circuit 220. The image processing circuit 220 may be configured to perform image processing to adjust the image, such as adjust luminance of individual pixels in the image data to account for information about the pixel circuits and the display panel. The driver circuitry 230 is configured to drive the source lines 130 based on the processed image data from the image processing circuit 220.

The controller 240 is configured to receive configuration information from the processing system 125 via the data interface 210. For example, the configuration information may include the image refresh rate that identifies the rate at which the display is to be updated in accordance with one or more examples. The controller 240 is configured to output a vertical synchronization (Vsync) signal, a horizontal synchronization (Hsync) signal, and/or a clock (CLK) signal. The Vsync signal is a trigger for the start of each Vsync period. The Hsync signal is a trigger for the start of each Hsync period. Additionally, and/or alternatively, the controller 240 outputs display information. The image processing circuit 220, driver circuitry 230, and sensing controller interface (I/F) 250 receive the Vsync, the Hsync, and/or the clock signal, while the sensing controller interface 250 also receives the display information. The display information may include the display configuration including the current display frame rate.

The sensing controller interface 250 is an interface that is connected to the proximity sensing controller 400 and is configured to transmit on the Vsync out (VSOUT) and Hsync out (HSOUT) link to the proximity sensing controller 400. The VSOUT link is a connection that transmits the Vsync signal and the HSOUT link is a connection that transmits the Hsync signal. In some variations, the sensing controller 250 also outputs the current display frame rate to the proximity sensing controller 400.

Figure 3:
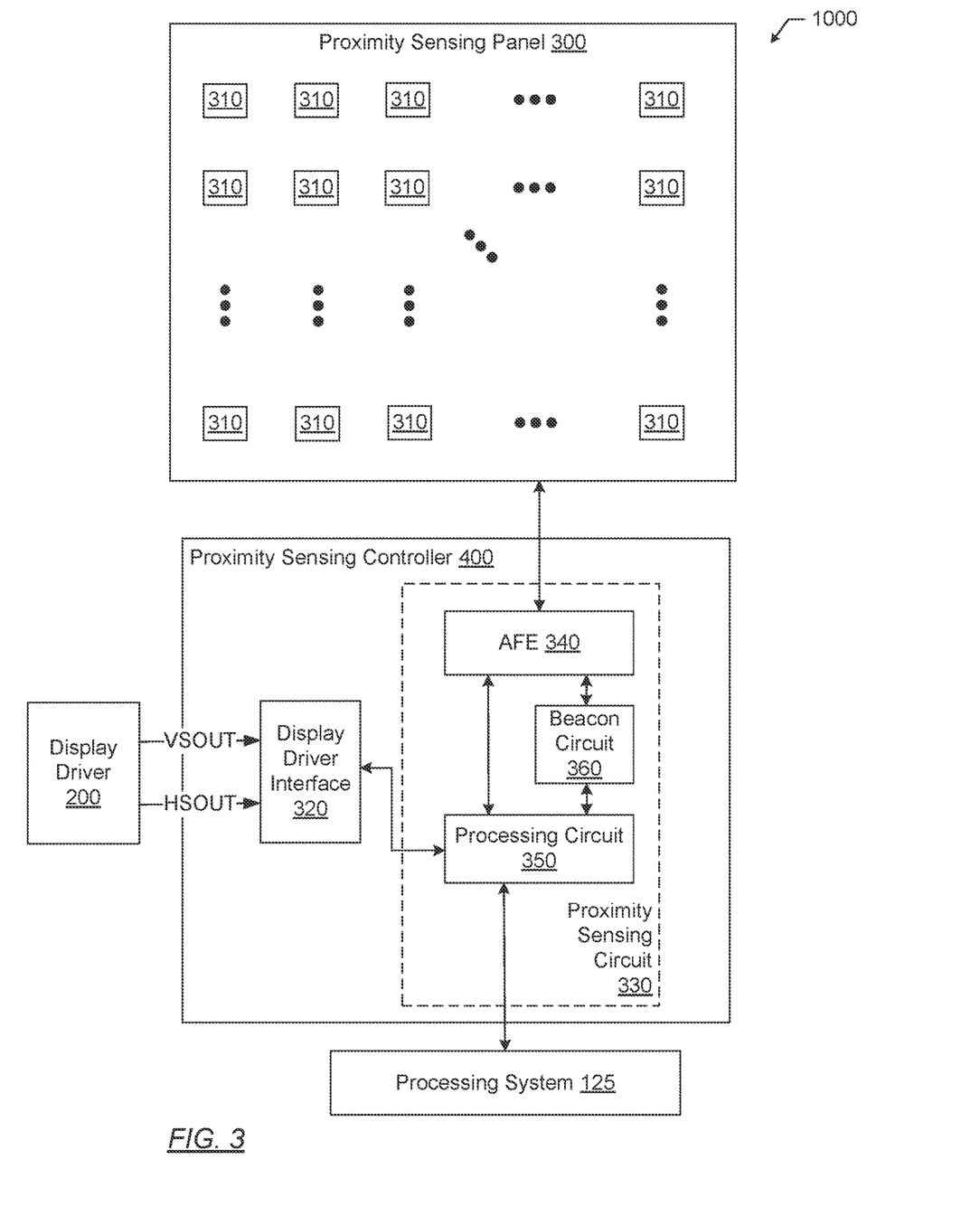
FIG. 3 shows an example configuration of a proximity sensing panel according to one or more examples of the present application.

FIG. 3 shows an example configuration of a proximity sensing panel according to one or more examples of the present application. As shown, the proximity sensing panel 300 includes an array of sensor electrodes 310 disposed over the display panel 100. The sensor electrodes 310 are used for proximity sensing to detect one or more input objects (e.g., the input object 175) located on or near the proximity sensing panel 300. As used herein, proximity sensing includes touch sensing, e.g., contact on the proximity sensing panel 300 and/or the display panel 100. The input object 175 include a stylus or pen such as a capacitive pen. In some instances, the proximity sensing panel 300 may include twelve sensor electrodes 310. In other instances, the proximity sensing panel 300 may include more or less than twelve sensor electrodes 310. In some variations, the sensor electrodes 310 are rectangular. In other variations, the sensor electrodes 310 may be shaped in a different shape, such as triangular, square, rhombic, hexagonal, irregular, or other shapes. Further, sensor electrodes may be configured in a variety of different configuration patterns, including bars that span vertically and/or horizontally across the panel.

The proximity sensing controller 400 is configured to sense one or more input objects based on resulting signals received from the sensor electrodes 310 and generate positional information of the one or more sensed input objects. "Positional information" as used herein broadly encompasses absolute position, relative position, velocity, acceleration, and other types of spatial information. Historical data regarding one or more types of positional information may also be determined and/or stored, including, for example, historical data that tracks position, motion, or instantaneous velocity over time. The generated positional information is provided to the processing system 125.

In some instances, the proximity sensing controller 400 is configured to sense one or more input objects through capacitive proximity sensing. Some capacitive proximity sensing implementations may utilize "absolute capacitance"

(also often referred to as "self-capacitance") sensing methods based on changes in the capacitive coupling between the sensor electrodes 310 and an input object (e.g., input object 175). In some variations, an input object near the sensor electrodes 310 alters the electric field near the sensor electrodes 310, thus changing the capacitive coupling. The resulting signals acquired from the sensor electrodes 310 include effects of the changes in the capacitive coupling. In some examples, an absolute capacitance sensing method operates by modulating the sensor electrodes 310 with respect to a reference voltage, e.g., system ground, and by detecting the capacitive coupling between the sensor electrodes 310 and input objects.

In some instances, the capacitive proximity sensing may utilize "transcapacitance" (also often referred to as "mutual capacitance") sensing methods based on changes in the capacitive coupling between transmitter electrodes (not shown) and the sensor electrodes 310. In some examples, an input object (e.g., input object 175) near the sensor electrodes 310 alters the electric field between the transmitter electrodes and the sensor electrodes 310, thus changing the capacitive coupling. In some variations, a transcapacitance sensing method operates by detecting the capacitive coupling between one or more transmitter electrodes and one or more sensor electrodes 310. The coupling may be reduced when an input object coupled to a system ground approaches the sensor electrodes 310. Transmitter electrodes may be modulated relative to a reference voltage, e.g., system ground. The transmitter electrodes may be a subset of the sensor electrodes 310 or separate sensor electrodes. Further, which sensor electrodes are used as transmitter electrodes and which sensor electrodes are used as receiver electrodes may change. The receiver electrodes 310 may be held substantially constant relative to the reference voltage or modulated relative to the transmitter electrodes to facilitate receipt of resulting signals.

The proximity sensing panel 300 is further configured to operate with the input object 175. For instance, the input object 175 may be a capacitive pen (e.g., a stylus) that has the transmitter electrode for transcapacitance sensing. For example, rather than using transmitter signals from the transmitter electrodes in the input device 1000, the transmitter signals may originate from the capacitive pen. The sensor electrodes 310 may receive resulting signals from the transcapacitive coupling with the transmitter electrode in the capacitive pen. In some instances, the input object 175 may transmit additional information, such as configuration information, state information, a position signal, and/or force data, to the input device 1000, which may be detected by the sensor electrodes 310 and provided to the proximity sensing controller 400. For example, the capacitive pen may have one or more buttons that may be used by a user to control an aspect of the user interface (e.g., color used in the interface or another aspect).

In order to communicate via the transcapacitive coupling, synchronization is performed with the input device 1000. The synchronization may be in the form of a beacon signal from the sensor electrodes 310 of the proximity sensing panel 300 that is received by the input object 175 when the input object 175 is in the sensing region (e.g., the sensing region 150). For example, the input device 1000 may transmit the beacon signal on sensor electrodes 310 that the capacitive pen may detect (e.g., a sensor in the tip of the capacitive pen). The detection circuit in the input object 175 uses the body of the input object 175 as a reference. Responsive to the beacon signal, the input object 175 transmits signals (e.g., force data and/or a position signal) for interpretation by the proximity sensing controller 400. Because the capacitive pen may be randomly removed from the sensing region, the beacon signal is repetitively transmitted. For example, the beacon signal may be transmitted at a defined rate, such as at 60 Hz or once every 16.66 ms. The rate of transmission of the beacon signal may be the beacon signal rate.

The proximity sensing controller 400 includes a display driver interface 320 connected to a proximity sensing circuit 330. In some instances, the display driver interface 320 is a general purpose I/O interface (GPIO) that is connected to the VSOUT link and HSOUT link from the display driver 200. The display driver interface 320 is configured to communicate with a processing circuit 350 in the proximity sensing circuit 330.

In some examples, the proximity sensing circuit 330 includes an analog front end (AFE) 340, a processing circuit 350, and a beacon circuit 360. The AFE 340 is configured to receive resulting signals from the sensor electrodes 310 and generate analog-to-digital conversion (ADC) data corresponding to the resulting signals. Generating the ADC data may include conditioning (filtering, baseline compensation, and/or other analog processing) of the resulting signals and analog-to-digital conversion of the conditioned resulting signals. In examples where the resulting signals from the sensor electrodes 310 are acquired in a time divisional manner, the AFE 340 may be configured to provide guarding voltage (Vguard) to sensor electrodes 310 from which resulting signals are not currently acquired. In examples where the proximity sensing is achieved through transcapacitive sensing from the transmitter electrodes in the proximity sensing panel 300, the AFE 340 may be configured to provide transmitter signals to the transmitter electrodes. The operation of the AFE 340 may be controlled based on one or more register values received from the processing circuit 350 and beacon circuit 360.

When a capacitive pen is not present, the AFE is configured to drive the sensor electrodes with capacitive sensing signals, and receive resulting signals from the sensor electrodes, whereby the resulting signals result from the capacitive sensing signals.

The processing circuit 350 is configured to process the resulting signals and determine a presence of an input object (e.g., the capacitive pen). The processing circuit 350 is configured to generate positional information of one or more input objects in the sensing region based on the resulting signals acquired from the sensor electrodes 310. In some variations, the processing circuit 350 may be configured to process the ADC data, which correspond to the resulting signals acquired from the sensor electrodes 310, to generate the positional information. The processing circuit 350 may also be configured to communicate with the input object 175. The processing circuit 350 may include a processor, such as a micro control unit (MCU), a central processing unit (CPU) and other types of processors, and firmware. The processing circuit 350 may be further configured to control the overall operation of the proximity sensing controller 400, including controlling the AFE 340 and the beacon circuit 360.

The beacon circuit 360 is configured to trigger driving the sensor electrodes 310 through the AFE 340 with a beacon signal. For instance, the beacon circuit 360 controls the timing of the driving of the sensor electrodes (310) with the beacon signal at the beacon signal rate. The beacon circuit 360 and/or the processing circuit 350 may alter the timing for sending the beacon signal to the input object (e.g., schedule the transmission of the beacon signal to avoid the noise). For instance, the beacon circuit 360 and/or the processing circuit 350 may have a timer for delaying a beacon signal (e.g., based on noise). The timer may be a hardware-based timer or a software-based timer. The amount of the delay may be controlled by the processing circuit 350 and/or the processing system 125. This will be described in further detail below.

It will be appreciated that the exemplary input device 1000 and the input object 175 depicted in FIGS. 1A, 1B, 2, and 3 are merely examples, and that the principles discussed herein may also be applicable to other input devices and/or other types of input objects.

FIGS. 4A and 4B depict exemplary representations 450, 460 of an input object providing user input to an input device and encountering noise according to one or more examples of the present application. For example, a user may use the input object (e.g., input object 175 such as a stylus) to provide user input to an input device (e.g., the input device 1000). Referring to FIG. 4A, using the input object 175, the user may attempt to draw a continuous squiggly line 452 across the input device 1000, and the proximity sensing panel 300 may use the sensor electrodes to detect the user input 452. As described above, based on detecting the user input 452 from the input object 175, the display panel 100 may display the user input 452 on the display screen 450. Unfortunately, due to noise interference during the transmission of the beacon signal, the input object 175 may become de-synched from the input device 1000. This de-synching may lead to portions of the user input 452 from being properly obtained by the proximity sensing panel 300, which causes the gaps 454 shown in the attempted squiggly line 452. For instance, due to the noise, the input object 175 may be unable to detect one or more beacon signals that are being provided by the input device 1000. This may cause the input object 175 to become de-synchronized from the input device 1000, and the input device 1000 may be unable to obtain and/or determine the user input 452, which causes the gaps 454 in the line 452.

As such, as will be described in further detail below, examples of the present disclosure describe altering the timing schedule for providing the beacon signal to the input object 175 to avoid and/or mitigate the noise interference. For instance, as mentioned above, the beacon signal may be provided to the input object 175 at a certain rate (e.g., 60 Hz or 16.66 ms intervals). The beacon signal transmission is typically around 1 ms in duration. The noise interference (e.g., noise from the power supply and/or converter) may be only around 20 μs to 50 μs in duration, and may occur periodically (e.g., every 3 or 4 ms). Accordingly, the control system of the input device 1000 (e.g., the beacon circuit 360 and/or the processing circuit 350) may use a delay to avoid the noise. For example, in some instances, the input object 175 may have a time window of around 2 ms to detect the beacon signal (e.g., a 2 ms window to search for and find the beacon signal transmitted by the beacon circuit 360). Therefore, because the duration of the noise interference may be significantly smaller than the beacon signal transmission duration and the time window of the input object 175 for detecting the beacon signal transmission, the control system may alter the timing schedule for providing the beacon signal to the input object 175 to avoid and/or mitigate the noise interference. For instance, the control system may set a delay, and delay the beacon signal transmission by a certain amount of time (e.g., by 1.1 ms). Therefore, the input object 175 may still be able to obtain the beacon signal and the input device 1000 avoids the noise interference. FIG. 4B shows a display screen 460 of an input device 1000 that alters the timing schedule for providing the beacon signal to the input object 175 to avoid and/or mitigate the noise interference.

For instance, referring to FIG. 4B and similar to FIG. 4A, using the input object 175, the user may attempt to draw a continuous squiggly line 462 across the input device 1000, and the proximity sensing panel 300 may use the sensor electrodes to detect the user input 462. The control system may alter the timing schedule for providing the beacon signal (e.g., by using a delay of 1.1 ms), which mitigates the impact of the noise interference. As such, comparing the display screens 450 and 460, there are significantly less gaps within the continuous squiggly lines 452 and 462. In some instances, the control system may alter the timing schedule based on detecting noise interference. For instance, the control system might not receive certain data (e.g., force data) from the input object 175 during a scheduled transmission window for the data. Based on not receiving the force data, the control system may alter the timing schedule for the beacon signal transmission (e.g., delaying the transmission by 1.1 ms). Additionally, and/or alternatively, the control system may use additional data or information from the input object 175 (e.g., a position signal) to determine whether the input object 175 has lost synchronization with the input device 1000 or whether the user merely lifted the input object 175 away from the input device 1000. The control system may determine whether to alter the timing schedule based on the data (e.g., the force data and a position signal) from the input object 175. This will be described in further detail below.

Figure 5:
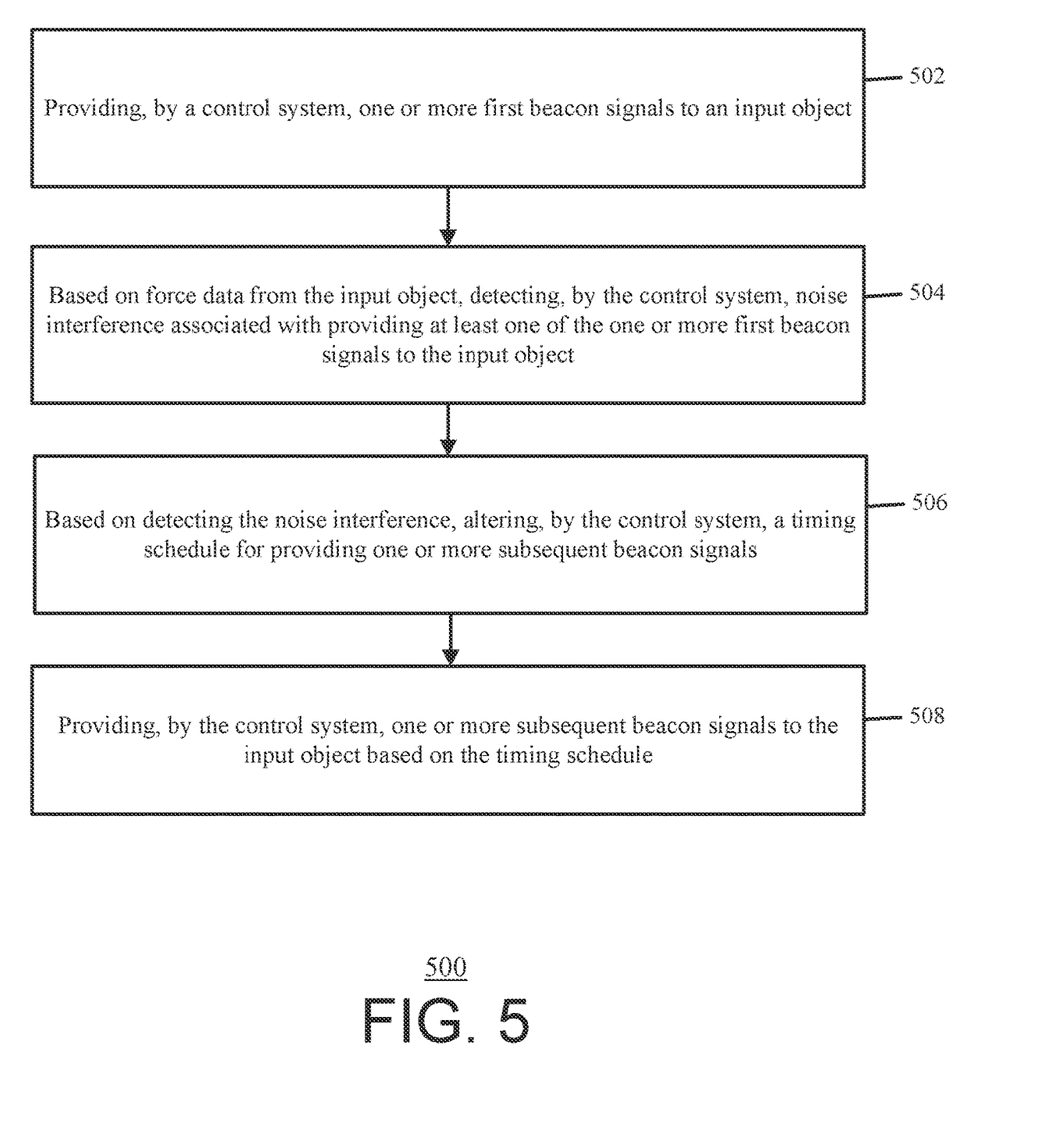
FIG. 5 is a flowchart of an exemplary process for altering the timing schedule for the beacon signal transmission according to one or more examples of the present application.

FIG. 5 is a flowchart of an exemplary process for altering the timing schedule for the beacon signal transmission according to one or more examples of the present application. The process 500 may be performed by the input device 1000 such as by the control system of the input device 1000 (e.g., the proximity sensing controller 400, the display driver 200, and/or the processing system 125). However, it will be recognized that any of the following blocks may be performed in any suitable order, and that the process 500 may be performed in any suitable environment. The descriptions, illustrations, and processes of FIG. 5 are merely exemplary and the process 500 may use other descriptions, illustrations, and processes for altering the timing schedule for the beacon signal transmission.

In operation, at block 502, a control system of an input device provides one or more first beacon signals (e.g., DSSS beacon signals) to an input object. For instance, the control system may be and/or include the proximity sensing controller 400, the display driver 200, and/or the processing system 125 of an input device such as input device 1000. The input object may be the input object 175 (e.g., a stylus or pen such as a USI pen). The control system (e.g., the processing circuit 350 and/or the beacon circuit 360 of the proximity sensing controller 400) may be configured to provide a first beacon signal to the input object 175.

Figure 6:
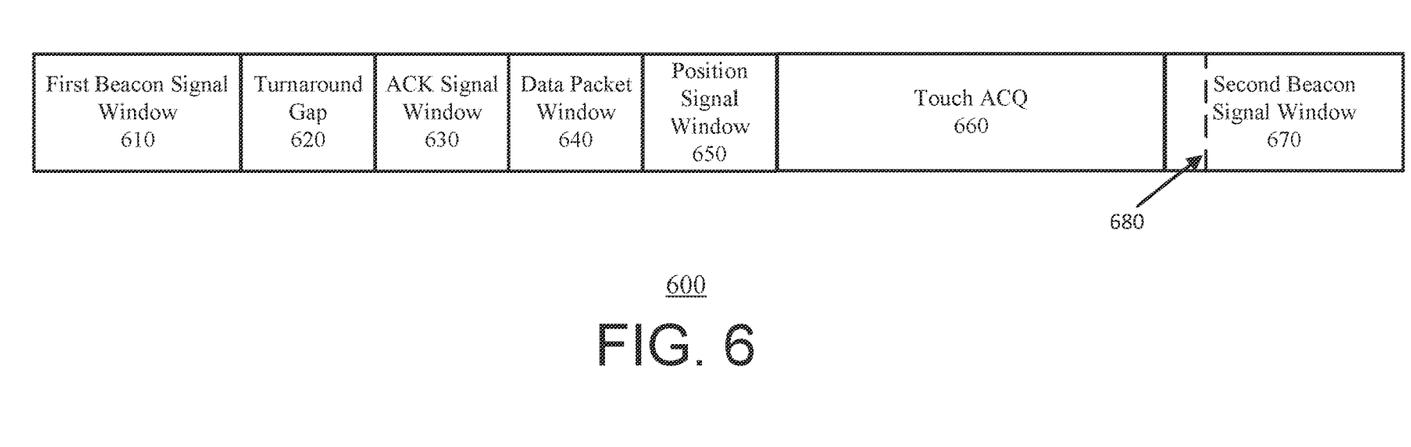
FIG. 6 shows an example timing diagram for the input object according to one or more examples of the present application.

For instance, as mentioned above, the input object 175 may be synchronized with the input device 1000 using the beacon signals, which may be transmitted at a pre-defined rate such as every 16.66 ms (60 Hz). Based on obtaining the beacon signal, the input object 175 may be configured to provide additional information to the input device 1000 such as force data and/or a position signal. For instance, FIG. 6 shows an example timing diagram 600 for the input object according to one or more examples of the present application. For example, the timing diagram 600 begins with a first beacon signal window 610. As mentioned previously, the first beacon signal window 610 may be 2 ms and used to detect a beacon signal transmission from the input device 1000. Afterwards, the timing diagram 600 includes a turnaround gap 620. The turnaround gap 620 follows the beacon signal window 610, and the turnaround gap 620 may be used to allow the input object 175 to process the beacon commands and/or to prepare a response to the beacon signal. Afterwards, the timing diagram 600 includes an acknowledgement (ACK) signal window 630, which allows the input object 175 to respond to the beacon signal. Following that are the data packet window 640, which permits the input object 175 to provide the force data (e.g., the force measurement) to the input device 1000, and the position signal window 650, which permits the input object 175 to provide the position signal to the input device 1000. The touch acquire (ACQ) stage 660 is after the position signal window 650. The touch ACQ stage 660 may be used as "idle" time for the input object 175 (e.g., the stylus or pen), and the input device 1000 may be configured to detect other input objects (e.g., the user's fingers) interacting with the input device 1000 during the touch ACQ stage 660. Further, the input device 1000 may continuously provide beacon signals to the input object 175 to ensure the synchronization between the input device 1000 and the input object 175. Accordingly, a frame (e.g., blocks 610-660) of the timing diagram 600 may repeat continuously. Therefore, as shown, timing diagram 600 includes a second beacon signal window 670 and a delay (e.g., a 1 ms delay) denoted by the dash line 680. As will be described below (e.g., block 506), the control system may alter a timing schedule for providing one or more subsequent beacon signals such as by using the delay shown by the dashed line 680. Then, while not shown, a second turnaround gap, ACK signal window, data packet window, position packet window, and so on may occur repeatedly. The timing diagram 600 is merely exemplary, and the input object 175 may a timing diagram that is different from the timing diagram 600. For instance, while the data packet window 640 and the position signal window 650 appear similar in duration (e.g., 1 ms each), the input object 175 may use a position packet window that is twice as long in duration as the data packet window. Additionally, and/or alternatively, the timing diagram may include additional windows for providing additional information to the input device 1000 such as configuration information and/or state information and/or additional types of windows such as a trailing time window. Additionally, and/or alternatively, the timing diagram may be a timing diagram that complies with the USI protocol.

Referring back to FIG. 5, at block 504, based on force data from the input object, the control system detects noise interference associated with providing at least one of the one or more first beacon signals to the input object. For instance, as mentioned previously, the input object 175 may become de-synchronized with the input device 1000 due to noise (e.g., noise from the charger) interfering with the transmission of the beacon signal. As such, due to the de-synchronization, the control system might not be able to obtain, detect, and/or otherwise determine that the input object 175 provided force data to the input device 1000. For instance, the input object 175 might not provide the force data within the data packet window 640 to the input device 1000 and/or the force data provided by the input object 175 may become corrupted such that the input device 1000 might not be able to detect that the force data provided by the input object 175 is actually the force data (e.g., the force data is determined by the input device 1000 as being invalid). Accordingly, based on the force data (e.g., the inability to obtain or detect the force data and/or the force data being invalid), the control system may detect noise interference after providing the first beacon signals to the input object. In some instances, the force data may include cyclic redundancy check (CRC) (e.g., a CRC bit), and the control system may determine the force data is invalid based on the CRC. Additionally, and/or alternatively, the force data may indicate extreme instability and/or the carrier signal associated with and/or within the force data may be weak (e.g., below a threshold). The control system may determine the force data is corrupted based on the extreme instability and/or the carrier signal. Additionally, and/or alternatively, the control system may use force data along with other information (e.g., a position signal) to detect noise interference. For instance, the force data may indicate zero or substantially zero, which may be a valid force of the input object 175, but the actual force applied by the control system may be greater than zero (e.g., the user is applying force to the input device 1000 using the input object 175, but the force data indicates zero due to noise interference). Accordingly, as will be described below, the control system may use force data along with other information to detect the noise interference.

In some examples, even if there is noise present in one beacon signal transmission, the input object 175 may still be able to maintain synchronization with the input device 1000. For instance, if the input object 175 fails to detect the beacon signal during one frame, the input object 175 may still be synchronized with the input device 1000 and search for the beacon signal during the next frame. As such, the noise may be present at multiple different beacon signal transmissions (e.g., consecutive and/or non-consecutive beacon signal transmissions) prior to there being de-synchronization between the input object 175 and the input device 1000. In some instances, the control system may use a threshold (e.g., three or four) prior to determining that there is noise interference. For example, the control system may count a number of times within a time interval that the control system failed to receive any force data within the data packet window 640 or when the control system determines that the force data received from the input object 175 is invalid. The control system may compare this number with the threshold to determine whether there is noise interference. For instance, the control system may determine that there were four frames in the last second with invalid force data from the input object 175. The control system may compare that number (e.g., four) with a threshold (e.g., three), and based on the comparison, determine that there is noise interference.

At block 506, based on detecting the noise interference (e.g., based on block 504), the control system alters a timing schedule for providing one or more subsequent beacon signals. For instance, the control system may use a timer to initiate a delay prior to sending the one or more subsequent beacon signals. For instance, the delay may be for a certain amount of time (e.g., 1.1 ms). The control system may transmit the beacon signal after the delay. For example, referring to FIG. 6, the dashed line 680 denotes a delay (e.g., a 1.1 ms delay) after the first frame has ended and prior to the second frame (e.g., beginning with the second beacon signal window 670) begins. The delay denoted by dashed line 680 may be used for noise avoidance. In some instances, and as mentioned previously, the beacon circuit 360 and/or the processing circuit 350 may include a timer (e.g., software or hardware implemented timer). The control system may use the timer of the beacon circuit 360 and/or the processing circuit 350 to initiate the delay prior to sending the one or more subsequent beacon signals.

In some examples, the control system may determine the delay based on testing. For instance, the control system may use an initial value (e.g., 1.1 ms) as the delay. However, the control system may still detect the noise interference. As such, the control system may determine one or more second values for the delay and continue testing these delay values (e.g., applying the delay and determining whether there is still noise interference with the delay). Then, the control system may select a best delay value (e.g., a delay value such as 1.5 ms that causes the least amount of detected noise interference), and use the selected delay value when transmitting the subsequent beacon signals.

At block 508, the control system provides one or more subsequent beacon signals to the input object based on the timing schedule. For instance, the control system may adjust the timing of the beacon signal transmission based on the delay (e.g., 1.1 ms or 1.5 ms). For example, to avoid the noise, the control system may delay the beacon signal transmission by 1.1 ms. As such, given that the beacon signal window 610/670 may be 2 ms in duration (e.g., the window for when the input object 175 is scanning or expecting the beacon signal transmission), even with the delay, the input object 175 may detect the beacon signal transmission within the beacon signal window 610/670. In some instances, the control system may use the delay for just one beacon signal. In other instances, the control system may use the delay for multiple beacon signal transmissions.

Process 500 is merely exemplary and as will be explained below, the control system may use additional and/or alternative blocks, steps, and/or algorithms to alter the timing schedule for providing the beacon signals in response to detecting noise interference.

Figure 7:
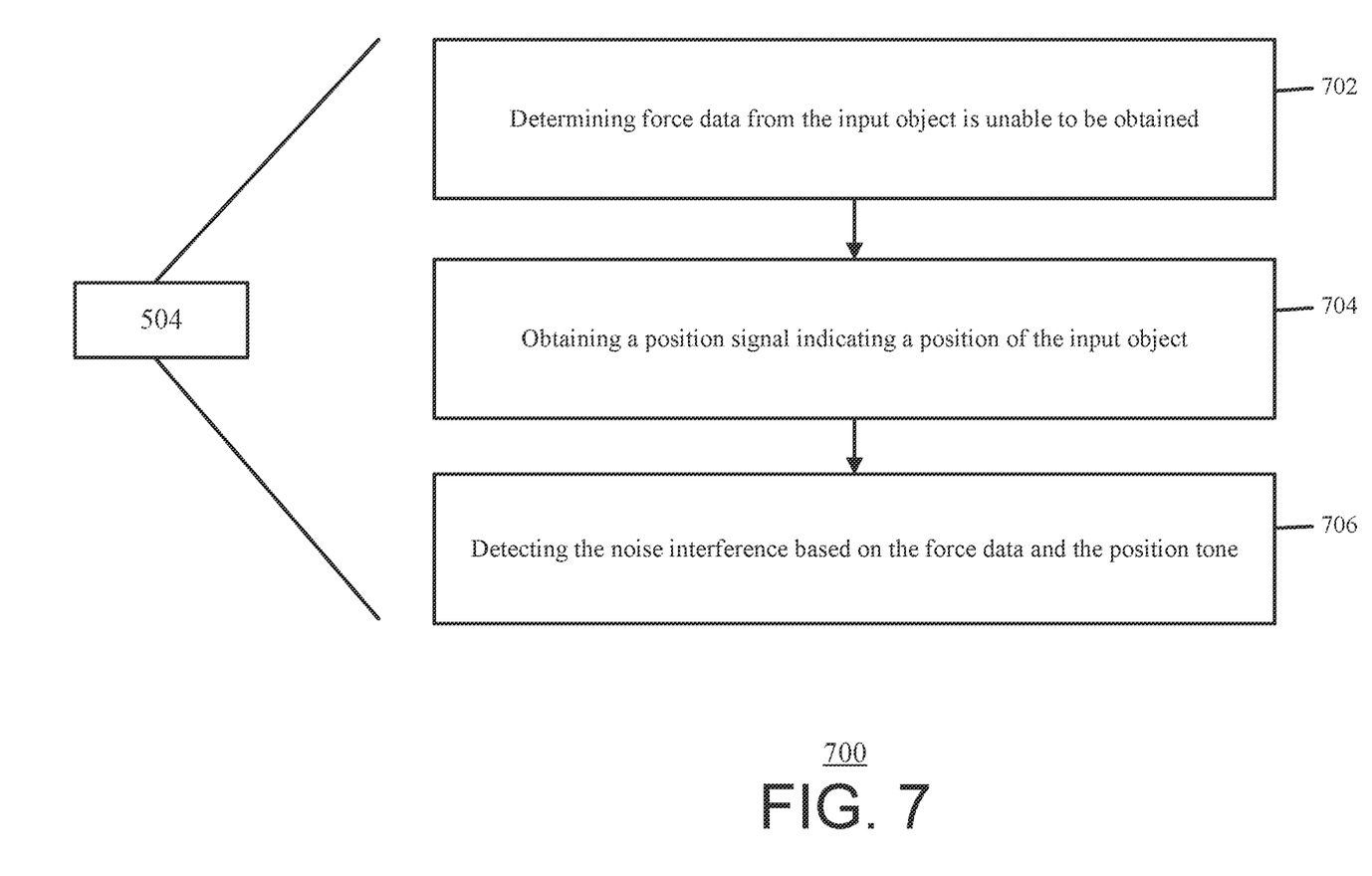
FIG. 7 is another flowchart of an exemplary process for altering the timing schedule for the beacon signal transmission according to one or more examples of the present application.

For example, FIG. 7 is another flowchart of an exemplary process for altering the timing schedule for the beacon signal transmission according to one or more examples of the present application. The process 700 may be performed by the input device 1000 such as by the control system of the input device 1000. However, it will be recognized that any of the following blocks may be performed in any suitable order, and that the process 700 may be performed in any suitable environment. The descriptions, illustrations, and processes of FIG. 7 are merely exemplary and the process 700 may use other descriptions, illustrations, and processes for altering the timing schedule for the beacon signal transmission.

For instance, process 700 may describe block 504 of FIG. 5 in more detail. For example, at block 702, the control system determines the force data from the input object 175 is unable to be obtained. For instance, the control system may determine the force data is unable to be obtained based on an absence of receiving the force data or the force data received from the input object 175 is invalid such that force applied by the input object 175 on the sensing region 150 is unable to be determined.

For example, as mentioned above, the input object 175 may include one or more sensors that are configured to detect a force applied by the input object 175. The one or more sensors may include and/or be a strain gauge. Then, at a timing window (e.g., the data packet window 640), the input object 175 may provide the detected force to the input device 1000. In some instances, due to the noise interference, the input object 175 may provide force data that is invalid. For instance, the force data may be in binary, which causes the force data to be more brittle and easier to become invalid. However, in other instances, the force data may become invalid due to proper user input such as when the user lifts the input object 175 away from the sensing region 150 of the input device 1000.

As such, the control system may use the force data along with other information, such as a position signal to determine whether there is noise interference or whether it is based on proper user input. For example, in some instances, the force data may become invalid and/or absent based on the user lifting the input object 175 away from the input device 1000 (e.g., if the user lifts the input object 175, then the force value may be at or move towards zero). In other instances, the force data may become invalid and/or absent based on de-synchronization caused by noise interfering with the transmission of the beacon signal.

Therefore, at block 704, the control system obtains a position signal indicating a position of the input object, and at block 706, the control system detects the noise interference based on the force data and the position signal. The position signal may be transmitted by the input object 175 during the position signal window 650. For example, to determine whether the force data's absence, invalidity, or substantially zero measurement was caused by proper user input or by noise interference, the control system may use the position signal. The position signal may include a tone signal such as a constant square wave or sine wave that is detectable by the sensor electrodes 310 of the proximity sensing panel 300. Based on the x-axis and y-axis associated with the sensor electrode 310 of the proximity sensing panel 300, the control system may determine a position of the input object 175. Furthermore, during proper user input (e.g., when the user lifts the input object 175 away from the sensing region 150), then the position signal may change slowly. For instance, at consecutive frames, the magnitude of the position signal (e.g., amplitude of the position signal) may gradually decrease in value as the user is lifting the input object 175 away from the sensing region 150. However, due to de-synchronization and noise interference, the magnitude of the position signal may change suddenly (e.g., a signal at one or more first frames may be strong and then suddenly, at a subsequent frame, the signal disappears or greatly reduces in magnitude). The control system may use a magnitude threshold to determine whether the position signal indicates noise interference or proper user input (e.g., if the decrease between consecutive frames exceeds a magnitude threshold, then the control system may determine the position signal indicates noise interference). Therefore, at blocks 704 and 706, the control system may use the position signal (e.g., the magnitude of the tone signal and the change in the tone signal over a period of time) to determine whether there was noise interference. Then, process 500 may continue such as by altering the timing schedule in response to determining, based on the position signal and the force data, that there was noise interference.

In some examples, referring to block 506 of FIG. 5, the control system may generate a noise profile and use the noise profile to alter the timing schedule for providing the subsequent beacon signals. For example, the control system may determine instances for when the noise interference is detected (e.g., by determining that the force data is absent or invalid and/or by using the position signal described in FIG. 7) and generate a noise profile based on these instances. For example, the control system may generate a noise profile indicating occurrences of the noise interference (e.g., noise events) as well as a time marker associated with each occurrence. Additionally, and/or alternatively, the noise profile may further indicate an average duration of the noise occurrence (e.g., 30 μs). Based on the noise profile, the control system may determine (e.g., estimate) a future occurrence of noise that may interfere with the beacon signal transmission and alter the timing schedule accordingly. For instance, the noise profile may indicate that the noise is associated with a periodic time interval (e.g., occurs every 3 ms or every 4 ms). Based on the periodic nature of the noise indicated by the noise profile, the beacon signal rate (e.g., a 60 Hz or 16.66 ms rate), and/or the duration of the noise occurrence, the control system may alter the timing schedule to avoid the noise. For instance, based on the noise profile indicating that the noise occurs every 4 ms and with a beacon signal rate of 60 Hz, the control system may determine the noise may impact the beacon signal transmission every six frames (e.g., at 16.66 ms, every six frames would be at 100 ms, which would coincide with the noise if the noise occurs every 4 ms). Accordingly, for every sixth frame, the control system may use a delay (e.g., 1.1 ms delay) when transmitting the beacon signal in order to avoid the noise.

In some variations, the control system may determine a drift rate and/or a drift direction, and use the drift rate and/or the drift direction to alter the timing schedule for providing the subsequent beacon signals. For example, the control system may provide the beacon signal at a frequency of 60 Hz (e.g., every 16.66 ms). However, in some instances, due to hardware and/or software constraints, the actual timing for providing the beacon signal may be slightly different from the expected timing. For instance, instead of providing the beacon signal every 16.66 ms, the control system may provide the beacon signal every 16.620 ms. The difference between the expected timing and the actual timing for providing the beacon signal may be the drift rate (e.g., the drift rate may be 0.46 ms, which is the difference between 16.66 ms minus 16.620 ms). The drift direction may indicate the direction of the drift rate (e.g., whether the actual timing for the beacon signal transmission is 0.46 ms before the expected timing or whether the actual timing for the beacon signal is 0.46 ms after the expected timing).

In some examples, the control system may use the noise profile to determine the drift rate and/or the drift direction. For instance, with a beacon signal rate of 16.66 ms and a noise profile indicating the noise occurs every 3 ms, then the control system may predict when an occurrence of a noise interference should occur. However, this occurrence may be different from when the noise actually occurs due to the drift rate and/or drift direction (e.g., from the beacon signal rate, the control system may determine that noise interference should occur every 10 frames, but the detected noise interference actually occurs every 12 frames). As such, the control system may determine the drift rate based on the expected occurrence of the noise interference and the actual detected noise interference. In some instances, the noise charge events may be 20 μs in duration and occur every 3 ms. Then, the noise profile may indicate that the noise events occur at times stamps, 0 ms, 3 ms, 6 ms, 9 ms, 12 ms, and so on. Further, based on the power being at 60 Hz, the beacon signal rate may be 60 Hz (e.g., being transmitted every 16.666 ms), but the proximity sensing panel 300 is operating slightly faster at 16.640 ms frame period. As such, the control system may determine the drift rate is 0.026 ms (e.g., 16.666 ms-16.640 ms). Then, the control system may calculate that the "collisions" (e.g., the noise interference events) may occur periodically every 115 frames (e.g., 3 ms for the periodic occurrence of the noise events divided by the drift rate of 0.026 ms). This means that a noise occurrence may occur every 1.9 seconds (e.g., 115 frames multiplied by 0.0166). Therefore, the control system may initiate a delay (e.g., jump forward) based on the noise interference events, and use the delay for providing the beacon signal (e.g., a delay of 1.1 ms). Furthermore, due to the drift rate, the control system may determine a new noise occurrence event caused by initiating the delay. For instance, due to the delay timer of 1.1 ms and the drift rate of 0.026 ms, the control system may determine another occurrence of the noise event after 42 frames (e.g., 1.1 ms divided by the drift rate of 0.026 ms). Accordingly, the control system may alter the timing schedule for the beacon signal transmission using a new delay to avoid the noise, and this may continuously repeat to avoid and/or mitigate the noise during the beacon signal transmission.

In some variations, the control system may use trial and error adjustments for the delay. For example, initially the control system may set the delay to 0.7 ms, and accumulate loss-of-sync statistics (e.g., a number of times the input object 175 lost synchronization with the input device 1000). Based on the statistics, the control system may then increase the delay to 0.8 ms, and re-accumulate loss-of-sync statistics. The control system may continuously change the delay until it determines (e.g., identifies) the optimal delay to minimize loss-of-sync events.

In some examples, the noise and/or beacon signal rate may be different from the values described above and the control system may alter the timing schedule for providing the subsequent beacon signals accordingly. For instance, in China, the frequency may be 50 Hz (e.g., China may use a 50 Hz power source to power the input device 1000), which may cause a different periodic noise profile to be generated. On an airplane, the frequency may be 100 Hz. The control system may determine the noise profile based on different periodic instances for the noise events (e.g., the noise interfering with the beacon signal transmission), and alter the timing schedule for subsequent beacon signals to avoid the noise from interfering with the beacon signal transmission.

In some variations, the input object 175 may provide a beacon missing signal (e.g., a negative acknowledgement ("nack") signal). For instance, during a timing window, the input object 175 may provide a beacon missing signal that is detectable by the input device 1000. Based on detecting the beacon missing signal, the control system may alter the timing schedule for providing the subsequent beacon signals (e.g., using a delay for the beacon signal transmission based on receiving the beacon missing signal).

In some instances, if a collision occurs (beacon aligned with noise), the control system may update the noise profile and may filter the position of the input object 175 that was reported (e.g., provided) to the control system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:
   providing, by a control system of an input device, one or more first beacon signals to an input object;
   based, at least in part, on force data from the input object, detecting, by the control system, noise interference associated with providing at least one of the one or more first beacon signals to the input object;
   generating, by the control system, a noise profile using the detected noise interference,
wherein the noise profile indicates a plurality of noise events and a plurality of time markers,
wherein each time marker, of the plurality of time markers, is associated with a noise event, of the plurality of noise events;
   based, at least in part, on the noise profile, altering, by the control system, a timing schedule for providing one or more subsequent beacon signals; and
   providing, by the control system, the one or more subsequent beacon signals to the input object based, at least in part, on the timing schedule.

2. The method of claim 1, wherein altering the timing schedule comprises setting a delay timer for providing the one or more subsequent beacon signals, and
   wherein providing the one or more subsequent beacon signals to the input object is based, at least in part, on the delay timer.

3. The method of claim 1, wherein detecting the noise interference comprises:
   determining the force data from the input object at one or more frames is invalid; and
   in response to the force data at the one or more frames being invalid, determining that the noise interference occurred during transmission of the one or more first beacon signals.

4. The method of claim 3, wherein detecting the noise interference further comprises:
   determining a number of frames that the force data from the input object is invalid; and
   comparing the number of frames with a threshold,
   wherein determining that the noise interference occurred during transmission of the one or more first beacon signals is based, at least in part, on comparing the number of frames with the threshold.

5. The method of claim 3, wherein detecting the noise interference further comprises:
   obtaining, from the input object, a position of the input object relative to the input device,
   wherein determining that the noise interference occurred during transmission of the one or more first beacon signals is further based, at least in part, on the position of the input object.

6. The method of claim 3, wherein detecting the noise interference further comprises:
   determining the force data from the input object at a plurality of frames is invalid;
   obtaining, from the input object, a plurality of position signals for the plurality of frames; and
   comparing a decrease in a magnitude of position signal between consecutive frames of the plurality of frames with a magnitude threshold,
   wherein determining that the noise interference occurred during transmission of the one or more first beacon signals is based, at least in part, on the comparison.

7. The method of claim 3, wherein each of the one or more frames comprises a beacon signal time window and a data packet window, wherein the beacon signal time window is a time window for transmission of a beacon signal of the one or more first beacon signals, and wherein the data packet window is a time window for providing the force data from the input object to the input device.

8. The method of claim 1, further comprising:
   determining, using the noise profile, that the plurality of noise events is associated with a periodic time interval,
   wherein altering the timing schedule for providing the one or more subsequent beacon signals is based, at least in part, on the periodic time interval and a beacon signal rate associated with providing the one or more first beacon signals and the one or more subsequent beacon signals to the input object.

9. The method of claim 1, further comprising:
   determining a drift rate using the noise profile, wherein the drift rate indicates a difference between an expected timing for providing the one or more first beacon signals and an actual timing for providing the one or more first beacon signals, and
   wherein altering the timing schedule for providing the one or more subsequent beacon signals is based, at least in part, on the noise profile and the drift rate.

10. The method of claim 1, further comprising:
    obtaining a negative acknowledgement signal from the input object, wherein the negative acknowledgement signal indicates the noise interference associated with the one or more first beacon signals,
    wherein altering the timing schedule for providing the one or more subsequent beacon signals is based on obtaining the negative acknowledgement signal.

11. An input device, comprising:
    a control system, comprising:
       one or more processors; and
       a non-transitory computer-readable medium having processor-executable instructions stored thereon, the processor-executable instructions, when executed by the one or more processors, facilitating performance of the following:

providing one or more first beacon signals to an input object;

based, at least in part, on force data from the input object, detecting noise interference associated with providing at least one of the one or more first beacon signals to the input object;

generating a noise profile using the detected noise interference, wherein the noise profile indicates a plurality of noise events and a plurality of time markers, wherein each time marker, of the plurality of time markers, is associated with a noise event, of the plurality of noise events; and based, at least in part, on the noise profile, altering a timing schedule for providing one or more subsequent beacon signals; and providing the one or more subsequent beacon signals to the input object based, at least in part, on the timing schedule.

12. The input device of claim 11, wherein altering the timing schedule comprises setting a delay timer for providing the one or more subsequent beacon signals, and wherein providing the one or more subsequent beacon signals to the input object is based, at least in part, on the delay timer.

13. The input device of claim 11, wherein detecting the noise interference comprises:

determining the force data from the input object at one or more frames is invalid; and in response to the force data at the one or more frames being invalid, determining that the noise interference occurred during transmission of the one or more first beacon signals.

14. The input device of claim 13, wherein detecting the noise interference further comprises:

determining a number of frames that the force data from the input object is invalid; and comparing the number of frames with a threshold, wherein determining that the noise interference occurred during transmission of the one or more first beacon signals is based, at least in part, on comparing the number of frames with the threshold.

15. The input device of claim 13, wherein detecting the noise interference further comprises:

obtaining, from the input object, a position of the input object relative to the input device, wherein determining that the noise interference occurred during transmission of the one or more first beacon signals is further based, at least in part, on the position of the input object.

16. The input device of claim 13, wherein detecting the noise interference further comprises:

determining the force data from the input object at a plurality of frames is invalid;

obtaining, from the input object, a plurality of position signals for the plurality of frames; and comparing a decrease in a magnitude of position signal between consecutive frames of the plurality of frames with a magnitude threshold, wherein determining that the noise interference occurred during transmission of the one or more first beacon signals is based, at least in part, on the comparison.

17. The input device of claim 11, wherein the processor-executable instructions further facilitate performance of the following:

determining, using the noise profile, that the plurality of noise events is associated with a periodic time interval, wherein altering the timing schedule for providing the one or more subsequent beacon signals is based, at least in part, on the periodic time interval and a beacon signal rate associated with providing the one or more first beacon signals and the one or more subsequent beacon signals to the input object.

18. A non-transitory computer-readable medium having processor-executable instructions stored thereon, the processor-executable instructions, when executed, facilitating performance of the following:

providing one or more first beacon signals to an input object;

based, at least in part, on force data from the input object, detecting noise interference associated with providing at least one of the one or more first beacon signals to the input object;

generating a noise profile using the detected noise interference, wherein the noise profile indicates a plurality of noise events and a plurality of time markers, wherein each time marker, of the plurality of time markers, is associated with a noise event, of the plurality of noise events;

based, at least in part, on the noise profile, altering a timing schedule for providing one or more subsequent beacon signals; and providing the one or more subsequent beacon signals to the input object based, at least in part, on the timing schedule.

* * * * *